(12) United States Patent
Choi et al.

(10) Patent No.: US 9,840,223 B2
(45) Date of Patent: Dec. 12, 2017

(54) FRONT AIRBAG FOR VEHICLE

(71) Applicants: Hyundai Motor Company, Seoul (KR); Kia Motors Corporation, Seoul (KR)

(72) Inventors: Jae Ho Choi, Seoul (KR); Kyung Taek Lim, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 15/223,280

(22) Filed: Jul. 29, 2016

(65) Prior Publication Data

US 2017/0253212 A1 Sep. 7, 2017

(30) Foreign Application Priority Data

Mar. 4, 2016 (KR) .......................... 10-2016-0026663

(51) Int. Cl.
*B60R 21/2338* (2011.01)
*B60R 21/233* (2006.01)

(52) U.S. Cl.
CPC ........ *B60R 21/2338* (2013.01); *B60R 21/233* (2013.01); *B60R 2021/23316* (2013.01); *B60R 2021/23382* (2013.01)

(58) Field of Classification Search
CPC .............. B60R 21/2338; B60R 21/233; B60R 2021/23316; B60R 2021/23382
See application file for complete search history.

(56) References Cited

U.S. PATENT DOCUMENTS

| | | | | |
|---|---|---|---|---|
| 6,155,595 A | * | 12/2000 | Schultz | B60R 21/233 280/729 |
| 6,361,072 B1 | * | 3/2002 | Barnes | B60R 21/233 280/728.1 |
| 6,502,858 B2 | * | 1/2003 | Amamori | B60R 21/233 280/739 |
| 6,616,184 B2 | * | 9/2003 | Fischer | B60R 21/205 280/735 |
| 7,281,734 B2 | * | 10/2007 | Abe | B60R 21/233 280/729 |
| 7,377,548 B2 | * | 5/2008 | Bauer | B60R 21/231 280/743.2 |
| 2007/0108753 A1 | | 5/2007 | Pang et al. | |

FOREIGN PATENT DOCUMENTS

| | | |
|---|---|---|
| JP | 01247242 A * | 10/1989 |
| JP | 2012-232748 A | 12/2012 |
| JP | 2015-009673 A | 1/2015 |
| JP | 2016-16730 A | 2/2016 |
| KR | 10-2012-0122744 A | 11/2012 |
| KR | 10-2016-0017997 A | 2/2016 |

* cited by examiner

*Primary Examiner* — Faye M Fleming
(74) *Attorney, Agent, or Firm* — Morgan, Lewis & Bockius LLP

(57) ABSTRACT

A front airbag apparatus for a vehicle may include an airbag chamber including front panels, and internal tethers connecting the front panels of the airbag chamber to an airbag housing and dividing the airbag chamber into a plurality of sections, in which lengths of the internal tethers may be smaller than a length of the airbag chamber in a front-rear direction of the vehicle, and when the airbag chamber is fully inflated, joints of the internal tethers on the front panels may be recessed, whereby the front panels may form a prominence-depression shape.

11 Claims, 6 Drawing Sheets

FRONT AIRBAG FOR VEHICLE

CROSS REFERENCE TO RELATED APPLICATION

The present application claims priority to Korean Patent Application No. 10-2016-0026663, filed Mar. 4, 2016, the entire contents of which is incorporated herein for all purposes by this reference.

BACKGROUND OF THE INVENTION

Field of the Invention

The present invention relates to an airbag that is positioned in front of a passenger in a vehicle and, more particularly, an airbag for preventing a passenger from hitting against a structure such as a crash pad and a center fascia inside a vehicle in an oblique collision.

Description of Related Art

As interest in the safety of passengers in vehicles has increased along with the functionality and convenience of vehicles, the importance of safety-related devices, which can protect passengers in the event of an accident, has increased. Among such safety devices for passengers, an airbag system in particular is basic equipment that distributes shocks applied to a passenger in the event of a collision.

In the safety devices, a front airbag is a basic one, which is installed in front of a passenger, prevents the passenger from directly hitting against various structures in a vehicle and blocks shock energy transmitted from the outside in a collision.

However, existing airbags cannot sufficiently protect passengers in an oblique collision, so when a passenger directly hits against a center fascia or the head of a passenger moves on an inflated airbag in a collision, their neck is injured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front airbag that can prevent damage to the neck of a passenger when the head of the passenger directly hits against a structure such as a center fascia or moves on an airbag chamber in an oblique collision of a vehicle.

According to various aspects of the present invention, a front airbag for a vehicle may include an airbag chamber including front panels, and internal tethers connecting the front panels of the airbag chamber to an airbag housing and dividing the airbag chamber into a plurality of sections, in which lengths of the internal tethers may be smaller than a length of the airbag chamber in a front-rear direction of the vehicle, and when the airbag chamber is fully inflated, joints of the internal tethers on the front panels may be recessed, whereby the front panels may form a prominence-depression shape.

The internal tethers may be formed in a shape of a panel and disposed in an up-down direction, so joints with the front panels may be recessed straight in the up-down direction when the airbag chamber is fully inflated.

The internal tethers may be arranged in a width direction of the vehicle and gaps between the internal tethers may be larger at joints with the front panels than at joints adjacent to the airbag housing.

The internal tethers may be disposed in a width direction of the vehicle and an innermost internal tether may be an active tether, and the front airbag may further include a controller configured to control the active tether to be cut so that an innermost chamber increases in size when it is determined that an oblique collision occurs.

Chambers divided by the internal tethers may have different sizes.

A plurality of chambers may be formed with an innermost chamber of the plurality of chambers having a largest size.

The front airbag may further include a base tether disposed between the internal tethers and the airbag housing, with a first end connected to the internal tethers and a second end connected to the airbag housing.

The base tether may be disposed in a width direction of a vehicle.

A size of the airbag chamber may correspond to a size of a front area of a passenger and a center fascia in a vehicle.

A recessed portion at a center of recessed portions of the front panels may be positioned to correspond to a position where a head of a passenger is loaded in a front collision.

An innermost recessed portion of recessed portions of the front panels may be positioned corresponding to a position where a head of a passenger is loaded in an oblique collision.

A size of the airbag chamber may be determined such that inside chambers from a center area of a passenger in a vehicle are larger in volume than door-side chambers.

According to the front airbag for a vehicle of various embodiments of the present invention, the front panels of the airbag chamber are formed such that the head of a passenger is loaded to the recessed portions in an oblique collision of a vehicle, so it is possible to prevent the head from sliding on the airbag. Further, since the innermost chamber is large, hard contact on the structure of a vehicle can be prevented by a sufficient supporting force.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
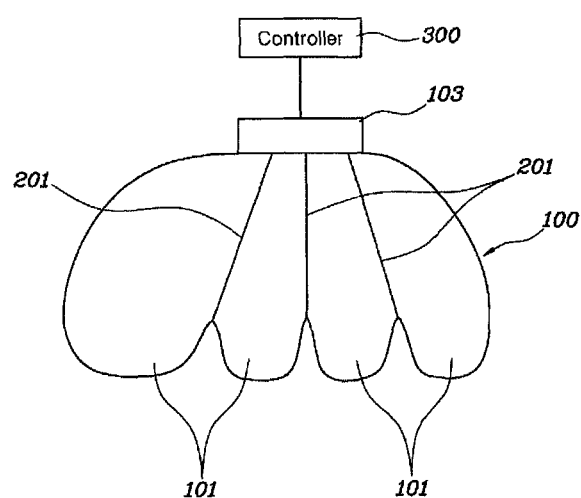
FIG. 1 is a view of a front airbag for a vehicle according to various embodiments of the present invention.
Figure 2:
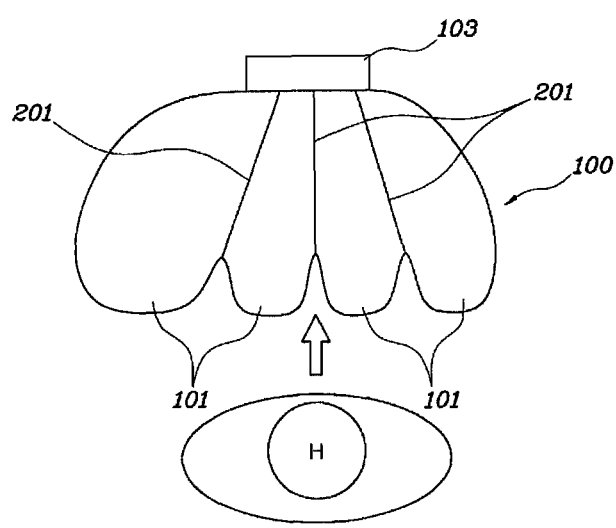
FIG. 2 is a view of the front airbag for a vehicle according to various embodiments of the present invention in a front collision.
Figure 3:
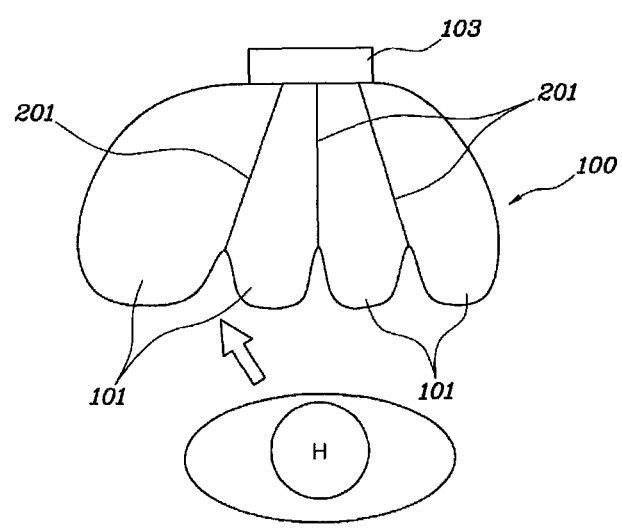
FIG. 3 and FIG. 4 are views of the front airbag for a vehicle according to various embodiments of the present invention in an oblique collision.
Figure 4:
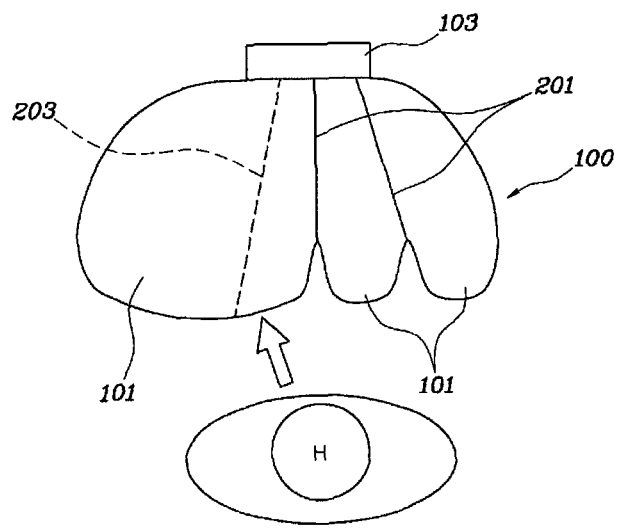
Figure 5:
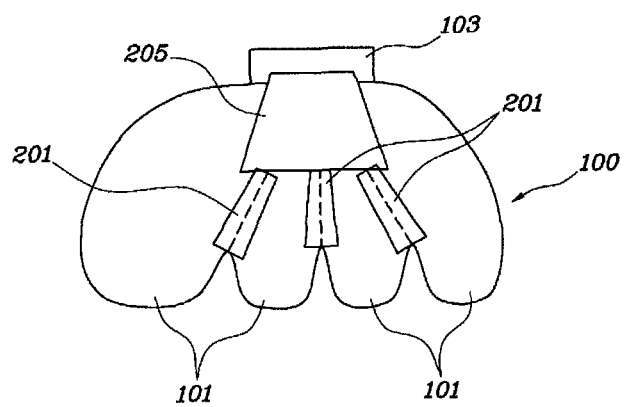
FIG. 5 is a view of a front airbag for a vehicle according to various embodiments of the present invention.
Figure 6:
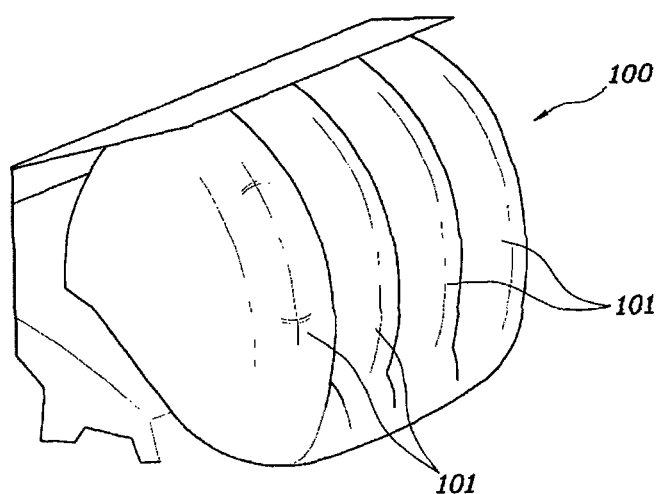
FIG. 6 and FIG. 7 are schematic views of the front airbag for a vehicle according to various embodiments of the present invention in an oblique collision.
Figure 7:
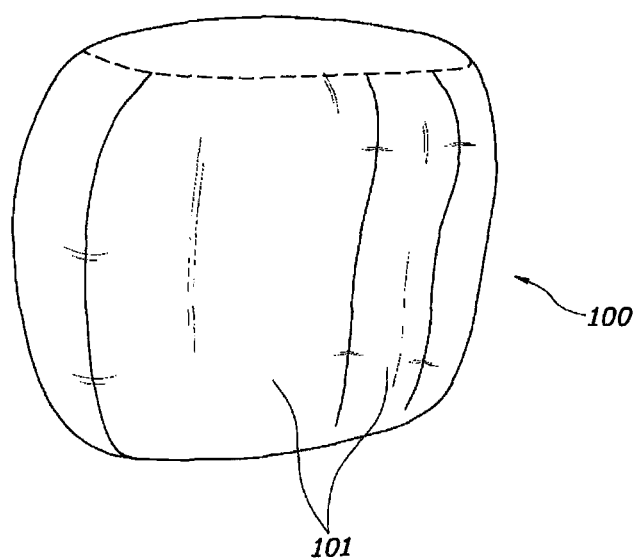

FIG. 1 is a view of a front airbag for a vehicle according to various embodiments of the present invention, FIG. 2 is a view of the front airbag for a vehicle according to various embodiments of the present invention in a front collision, FIGS. 3 and 4 are views of the front airbag for a vehicle according to various embodiments of the present invention in an oblique collision, FIG. 5 is a view of a front airbag for a vehicle according to various embodiments of the present invention, and FIGS. 6 and 7 are schematic views of the front airbag for a vehicle according to various embodiments of the present invention in an oblique collision.

A front airbag for a vehicle according to various embodiments of the present invention includes an airbag chamber 100, and internal tethers 201 that connect front panels 101 of the airbag chamber 100 to an airbag housing 103, in which the front-rear lengths of the internal tethers 201 are smaller than the front-rear length of the airbag chamber 100, so when the airbag chamber 100 is fully inflated, the joints of the internal tethers 201 on the front panels 101 are recessed, whereby the front panels 101 form a prominence-depression shape.

The internal tethers 201 are formed in the shape of a panel and disposed in the up-down direction, so the joints with the front panels 101 can be recessed straight in the up-down direction when the airbag chamber 100 is fully inflated.

The internal tethers 201 are arranged in the width direction of a vehicle and the gaps between the internal tethers 201 may be larger at the joints with the front panels 101 than at the joints close to the airbag housing 103.

The size of the airbag chamber 100 may be determined to correspond to the size of the area between a passenger and the center fascia in a vehicle.

In general, front airbags are installed in a steering wheel or a crash pad inside a vehicle. Accordingly, when a collision is sensed through various signal values from sensors in the front part of a vehicle or an ECU, the front airbags quickly inflate and prevent passengers from directly hitting various structures on the car body, absorbing shock from the outside.

In the related art, a driver has been protected by a curtain airbag and a front airbag in a collision of a vehicle. However, not in a front or side collision, but in an oblique collision, passengers cannot be sufficiently protected due to unexpected movement of the passengers in some cases.

In detail, for example, the head H of a passenger is loaded not to the center, but to a side of the airbag chamber 100 in an oblique collision. In this case, the indoor side of the airbag chamber 100 cannot support the head H and is crushed, so the head H slides down on the airbag chamber 100 and directly hits against a crash pad or a center fascia, whereby the head is injured. Further, while the head H slides down on the indoor side of the airbag chamber 100, the head H turns, and accordingly, the neck or the brain is injured in some cases.

According to various embodiments of the present invention, however, as shown in FIGS. 1 to 4, the surfaces of the front panels 101 where the head H of a passenger is loaded form a prominence-depression shape. In detail, the length of the internal tethers 201 connecting the front panels 101 to the airbag housing 103 is made smaller than the front-rear length of the airbag chamber 100 so that the joints of the internal tether 201 on the front panels 101 are recessed when the airbag chamber 100 is fully inflated, thereby making the prominence-depression shape. The internal tethers 201 are formed in the shape of a panel and connected to the front panels 101 in the up-down direction so that the joints with the front panels 101 are recessed straight in the up-down direction when the airbag chamber 100 is fully inflated.

When the head H of a passenger is loaded on the airbag chamber, the head H is pushed into the recessed portions of the front panels 101, so the head does not slide on the airbag chamber 100. Accordingly, it is possible to prevent the head H of a passenger from directly hitting against a structure such as a center fascia or a crash pad in a vehicle even in an oblique collision.

Further, it may be possible to increase the number of recessed portions on the front panels 101 by increasing the number of the internal tethers 201 so that the head of a passenger does not slide even if the head H is loaded to the airbag chamber at various angles.

A plurality of internal tethers 201 is provided in the width direction of a vehicle, in which the innermost internal tether 201 is an active tether 203, and the front airbag of the present invention may further include a controller 300 that cuts the active tether 203 so that the innermost chamber increases in size when it is determined that an oblique collision has occurred.

The chambers divided by the internal tethers 201 may have different sizes. In the chambers, the innermost chamber may have the largest size.

The size of the airbag chamber 100 may be determined such that the inside chambers from the center of a passenger in a vehicle are larger in volume than the door-side chambers.

When the head H of a passenger is loaded onto the indoor side of the airbag chamber 100 in an oblique collision, the phenomenon that the head H slides down on the airbag chamber 100 can be solved by the prominence-depression shape made by the front panels 101, but the problem that the inside chambers are not sufficiently inflated and crushed may remain in accordance with the loading strength.

Accordingly, the innermost tether of the internal tethers 201 is cut so that the innermost chamber is increased in size and gas is sufficiently supplied, as shown in FIGS. 3 and 4, and accordingly, the airbag can keep a sufficient supporting force without being crushed.

In detail, the innermost internal tether 201 is an active tether controlled by the controller 300. When it is determined that an oblique collision occurs on the basis of information obtained from various data from sensors at the front part of a vehicle or an ECU, the controller 300 controls to cut the active tether 203 so that the innermost chamber increases in size.

The front airbag may further include a base tether 205 that is disposed between the internal tethers 201 and the airbag housing 103, with an end connected to the internal tethers 201 and the other end connected to the airbag housing 103. The base tether 205 may be disposed in the width direction of a vehicle.

The size of the airbag chamber 100 may depend even on the size of a vehicle where it is mounted. However, when specific internal tethers 201 are manufactured in accordance with the kinds of vehicles, the manufacturing process and the assembly time of the products are increased.

Accordingly, as shown in FIG. 5, the base tether 205 is provided as a common part that can be connected to an airbag housing for all kinds of vehicles. Further, it is possible to share parts by manufacturing the internal tethers 201 and the airbag chamber 100 in advance in accordance with airbag chambers having various sizes to be mounted in various vehicles and then combining the base tether 205 with the internal tethers 201. Accordingly, it is possible to reduce the manufacturing costs and simplify the manufacturing process.

Among the recessed portions of the front panels 101, the recessed portion at the center may be positioned to correspond to the position where the head H of a passenger is loaded in a front collision. Among the recessed portions of the front panels 101, the innermost recessed portion may be positioned to correspond to the position where the head H of a passenger is loaded in an oblique collision.

When the recessed portion at the center among the recessed portions of the front panels 101 is positioned to correspond to the position where the head H of a passenger is loaded in a front collision and the innermost recessed portion is positioned to correspond to the position where the head H of a passenger is loaded in an oblique collision, it is possible to protect a passenger from injury under various situations including not only an oblique collision, but a front collision.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front airbag apparatus for a vehicle, comprising:
an airbag chamber including front panels; and
internal tethers disposed in the airbag chamber and connecting the front panels of the airbag chamber to an airbag housing connected to the airbag chamber and dividing the airbag chamber into a plurality of chambers,
wherein lengths of the internal tethers are smaller than a front-rear length of the airbag chamber in a front-rear direction of the vehicle, and when the airbag chamber is fully inflated, first joints of the internal tethers on the front panels are recessed, whereby the front panels form a prominence-depression shape,
wherein the internal tethers are disposed in a width direction of the vehicle and an innermost tether of the internal tethers is an active tether; and
wherein a controller is configured to control the active tether to be cut so that an innermost chamber of the plurality of chambers increases in size when an oblique collision is, by the controller, to occur to the vehicle.

2. The front airbag apparatus of claim 1, wherein the internal tethers are formed in a shape of a panel and disposed in an up-down direction of the airbag chamber, so that the first joints of the front panels are recessed straight in an up-down direction when the airbag chamber is fully inflated.

3. The front airbag apparatus of claim 1, wherein the internal tethers are arranged in a width direction of the vehicle and gaps between the internal tethers are larger at the first joints with the front panels than at second joints of the internal tethers adjacent to the airbag housing.

4. The front airbag apparatus of claim 1, wherein the chambers divided by the internal tethers have different sizes.

5. The front airbag apparatus of claim 1, wherein the plurality of chambers is formed with an innermost chamber having a largest size.

6. The front airbag apparatus of claim 1, further comprising a base tether disposed between the internal tethers and the airbag housing, wherein the base tether includes a first end connected to the internal tethers and a second end connected to the airbag housing.

7. The front airbag apparatus of claim 6, wherein the base tether is disposed in a width direction of the vehicle.

8. The front airbag apparatus of claim 1, wherein a size of the airbag chamber corresponds to a size of a front area of a passenger's seat and a center fascia in the vehicle.

9. The front airbag apparatus of claim 3, wherein the air bag chamber has a recessed portion at a center of recessed portions of the front panels.

10. The front airbag apparatus of claim 3, wherein the air bag chamber has an innermost recessed portion of recessed portions of the front panels.

11. The front airbag apparatus of claim 4, wherein a size of the airbag chamber is determined such that inside chambers of the chambers from a center area of a passenger's seat in the vehicle are larger in volume than door-side chambers of the chambers.

* * * * *